United States Patent
Shyu

(10) Patent No.: US 7,100,068 B2
(45) Date of Patent: Aug. 29, 2006

(54) PANEL DEVICE FOR ADJUSTING COMPUTER'S OPERATING FREQUENCY AND SHOWING SYSTEM INFORMATION

(75) Inventor: Ruey-Ching Shyu, Tainan (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 583 days.

(21) Appl. No.: 10/370,468

(22) Filed: Feb. 24, 2003

(65) Prior Publication Data

US 2004/0148530 A1  Jul. 29, 2004

(30) Foreign Application Priority Data

Jan. 23, 2003  (TW) ............... 92201284 U

(51) Int. Cl.
*G06F 1/08* (2006.01)
*G09G 5/00* (2006.01)

(52) U.S. Cl. ...................... 713/600; 345/1.1
(58) Field of Classification Search ............ None
See application file for complete search history.

(56) References Cited

U.S. PATENT DOCUMENTS

| | | | |
|---|---|---|---|
| 5,408,573 A * | 4/1995 | Jamieson et al. ........... 388/815 |
| 5,495,390 A * | 2/1996 | Yu ............................... 361/683 |
| 5,933,614 A * | 8/1999 | Tavallaei et al. ............ 710/306 |
| 6,321,091 B1 * | 11/2001 | Holland ................... 455/414.2 |
| 6,336,091 B1 * | 1/2002 | Polikaitis et al. ........... 704/233 |
| 6,580,884 B1 * | 6/2003 | Kuwabara ..................... 399/92 |
| 6,586,887 B1 * | 7/2003 | Oogoshi et al. ......... 315/111.41 |
| 6,704,879 B1 * | 3/2004 | Parrish ....................... 713/322 |
| 6,763,458 B1 * | 7/2004 | Watanabe et al. ........... 713/100 |
| 6,816,975 B1 * | 11/2004 | Sasaki et al. ............... 361/103 |
| 6,895,517 B1 * | 5/2005 | Wang ......................... 713/300 |

* cited by examiner

Primary Examiner—Lynne H. Browne
Assistant Examiner—Anand B. Patel
(74) Attorney, Agent, or Firm—Bacon & Thomas, PLLC

(57) ABSTRACT

A panel device mounted on a computer case comprises an adjustment unit for adjusting CPU's operating frequency, a display module for showing system information, and a microprocessor which interconnects the adjustment unit and the display module with the computer system. The microprocessor can perform adjustment done by the adjustment unit and issue a service request signal to the computer. In response, the computer issues signals about system information to the microprocessor for being processed and showed on the display module.

11 Claims, 2 Drawing Sheets

PANEL DEVICE FOR ADJUSTING COMPUTER'S OPERATING FREQUENCY AND SHOWING SYSTEM INFORMATION

BACKGROUND OF THE INVENTION

1. Field of the Invention

The present invention relates to a computer's panel device, and more particularly, to a panel device mounted on the front side of a computer case for enabling an end-user to adjust the computer's operating frequency directly and showing valuable system information effectively.

2. Description of Related Art

Since the CPU (central processing unit) is the major component of a computer, the processing speed of the computer is strongly associated with the operating frequency of the CPU. Conventionally, an adjustment (e.g., increasing or decreasing) of the operating frequency of the CPU is done by running a software (e.g., an application or adjusting the BIOS (basic input output system)) or setting jumpers on the motherboard of a computer.

However, both approaches are not satisfactory. For example, the software for adjusting the CPU's frequency is not popular, and the use of such software or jumpers to change the frequency is not easy to a non-professional user. Moreover, there are typically only two or three LEDs (light-emitting diodes) provided on the front side of a computer case for showing the status about the operations of hard disk or system. Other valuable information, such as CPU speed, CPU temperature, system temperature, etc., is not available. Instead, they are only available by running a specific software.

Therefore, it is desirable to provide a novel panel device mounted on the front side of a computer case for enabling the end-user to adjust the computer's operating frequency directly and showing valuable system information effectively in order to mitigate and/or obviate the aforementioned problems.

SUMMARY OF THE INVENTION

One purpose of the presented invention is to provide a panel device mounted on a computer case for enabling the end-user to adjust the computer's operating frequency directly, meanwhile, showing the actual operating frequency on this panel.

The other purpose of the present invention is to provide a panel device mounted on a computer case for showing valuable system information of the computer.

Here the computer includes a central processing unit (CPU), a basic input output system (BIOS), a system management (SM) bus and a system clock generator. The system clock generator provides a plurality of system clocks, wherein one of the system clocks is the operating frequency of the CPU. The panel device comprises: an adjustment unit having a plurality of adjustment stages for enabling a user to selectively increase or decrease the operating frequency of the CPU; a display module for showing the system information; and a microprocessor that interconnects the adjustment unit and the display module with the CPU. The microprocessor is capable of adjusting the operating frequency of the CPU in response to an adjustment done by the adjustment unit, wherein the microprocessor issues an interrupt signal to the CPU for interrupting the CPU so as to control the system clock generator to modify the operating frequency of the CPU via the BIOS and SM bus. The microprocessor also issues a service request to the computer to request the system information and then displays the system information on the display module.

The novel features of the invention will be described more detailed accompanied with figures in the following.

DETAILED DESCRIPTION OF THE PREFERRED EMBODIMENT

Figure 1:
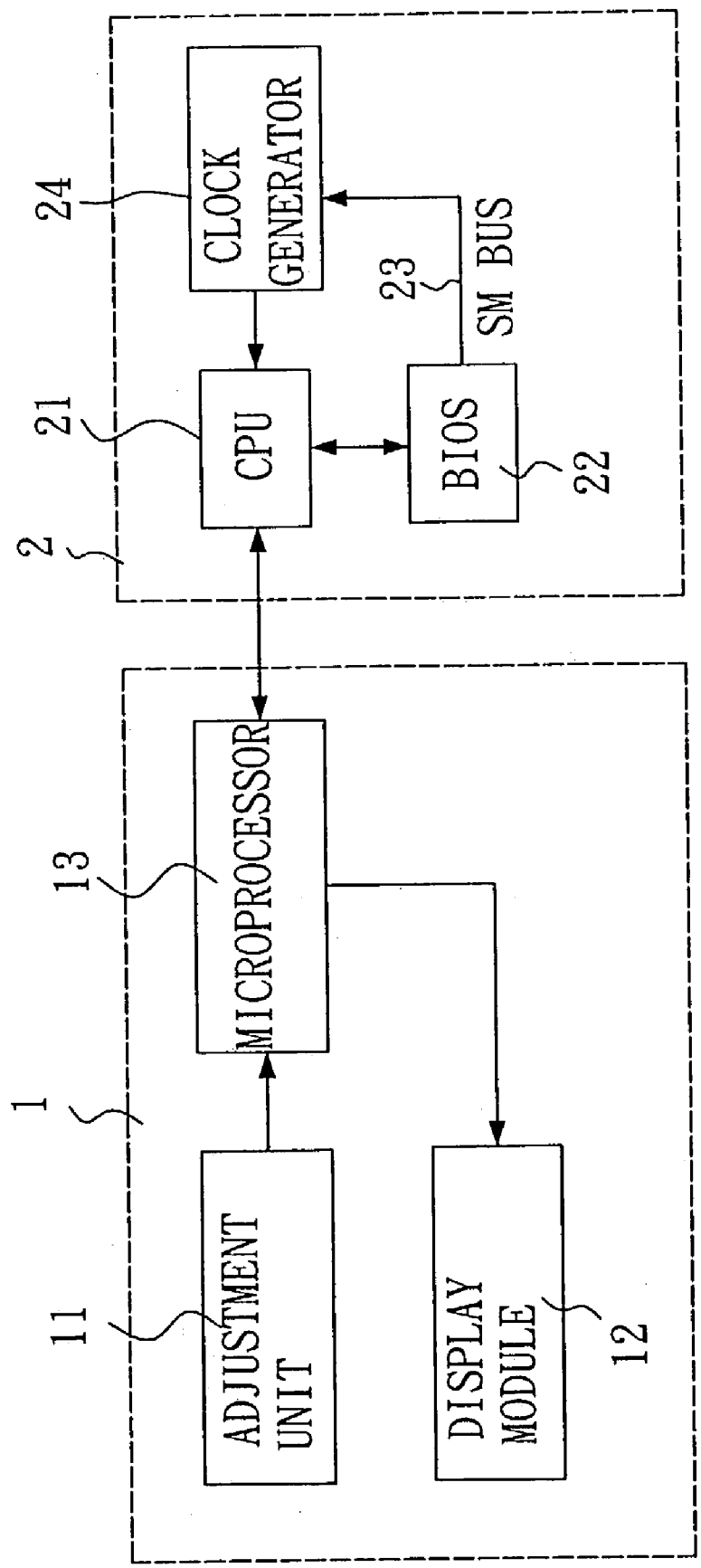
FIG. 1 is the block diagram of the invented panel device mounted on the front side of a computer case.

Shown in FIG. 1 is the block diagram of invented panel device 1, wherein the panel device 1 is mounted on the front side of a case of a computer 2 which includes a central processing unit (CPU) 21, a basic input output system (BIOS) 22, a system management (SM) bus 23 and a system clock generator 24. The panel device 1 comprises an adjustment unit 11, a display module 12, and a microprocessor 13. The microprocessor 13 is intended to interconnect the adjustment unit 11 and display module 12 with CPU 21 of the computer 2. The system clock generator 24 generates a plurality of system clocks, i.e., operating frequency for CPU, operating frequency for advanced graphics port (AGP) or peripheral component interconnect (PCI) buses, or operating frequency for other peripherals.

The communication between the microprocessor 13 and the adjustment unit 11 can be interrupt or polling. The microprocessor 13 receives a regulation signal sent by the adjustment unit 11, and then processes the regulation signal for transmitting to the computer 2 in order to adjust the operating frequency of CPU 21. Namely, when the microprocessor 13 receives the regulation signal, the microprocessor 13 issues an interrupt signal to CPU 21 for interrupting CPU 21 so that the interrupt service routine of BIOS 22 receives a message issued by the microprocessor 13 and controls the system clock generator 24 to generate a new operating frequency of CPU 21 via SM bus 23 without changing the other system clocks.

Furthermore, the microprocessor 13 is able to issue a service request signal to the computer 2 for inquiring about system information. In response, the computer 2 issues signals about system information to the microprocessor 13. The microprocessor 13 then processes the signals and shows the corresponding system information on the display module 12. In one embodiment, the microprocessor 13 is coupled to a system monitoring integrated circuit (IC) (not shown) of the computer 2. The system monitoring IC is responsible for processing the inquiry and issuing signals about system information to the microprocessor 13.

In this embodiment, the adjustment unit 11 is preferably a knob, or a set of buttons including a speed-up button and a speed-down button. Multiple adjustment stages are provided in the adjustment unit 11 for adjusting the operating frequency of CPU 21. In a case that the adjustment unit 11 is a knob, a left rotation of one mark will cause CPU 21 to decrease its operating frequency by one stage. Likewise, a right rotation of one mark on the knob will cause CPU 21 to increase its operating frequency by one stage. In another case that the adjustment unit 11 is a set of buttons, a press of the speed-down button will cause CPU 21 to decrease its operating frequency by one stage. Likewise, a press of the speed-up button will cause CPU 21 to increase its operating frequency by one stage. Almost at the same time, a corresponding display of the adjusted operating frequency is shown on the display module 12 in response to a processing of the adjustment by the microprocessor 13. Moreover, system information, such as CPU temperature, system temperature of the computer 2, etc., can be shown on the display module 12, as will be described in detail below.

Figure 2:
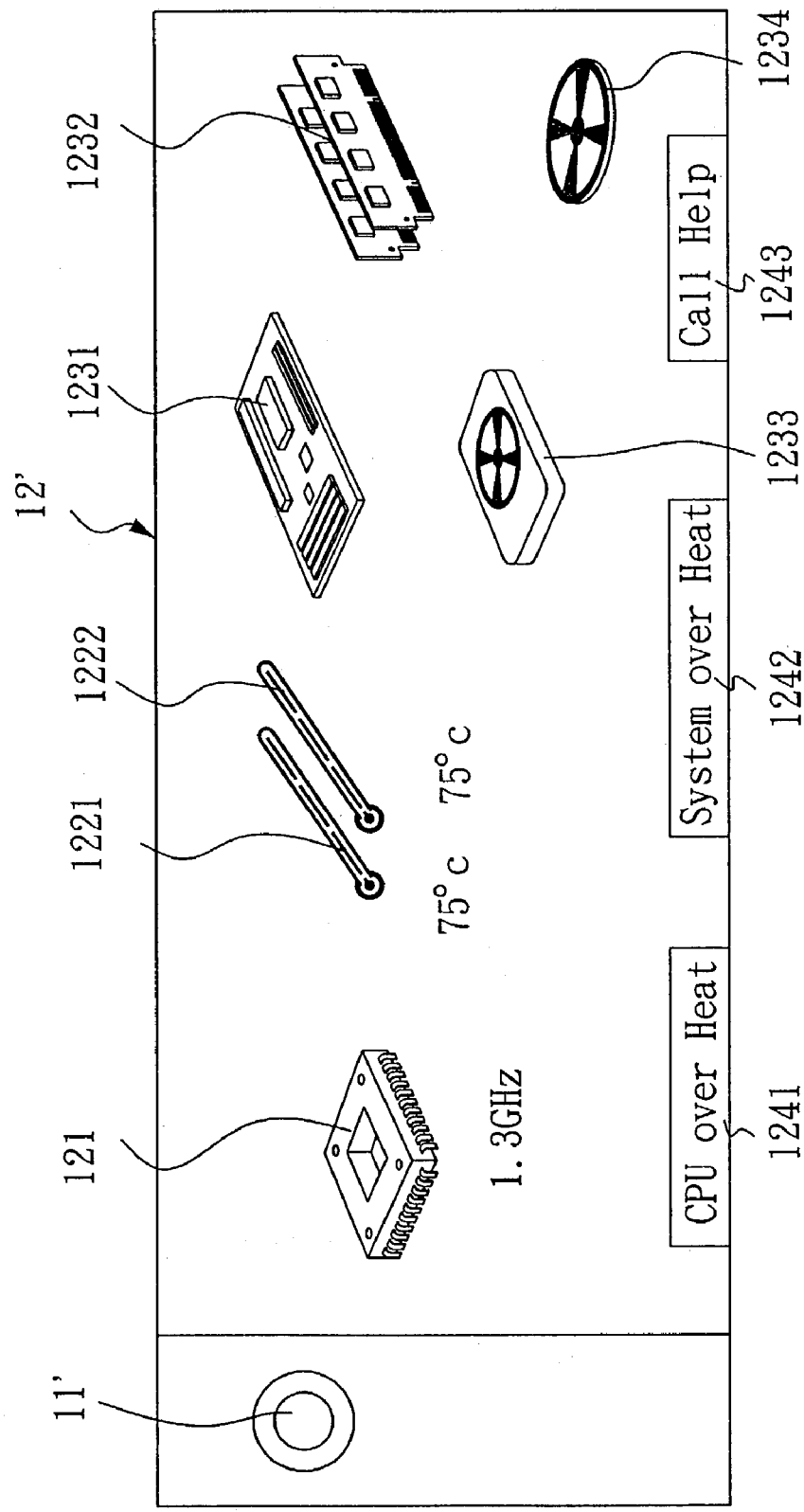
FIG. 2 is an outline of adjustment unit and display module of the invented panel device.

With reference to FIG. 2, a detailed illustration of the adjustment unit 11' and the display module 12' is shown. The display module 12' is implemented as a LED display or LCD (liquid crystal display). For the purpose of displaying system information, the display 12' comprises an operating frequency indicator 121, a CPU temperature indicator 1221, a system temperature indicator 1222, a motherboard status indicator 1231, a memory status indicator 1232, a hard disk status indicator 1233, a CD-ROM status indicator 1234, a CPU over-temperature indicator 1241, a system over-temperature indicator 1242, and a call-help indicator 1243.

In response to power-on of the computer 2, the computer 2 issues acknowledgement signals of operating unit to the panel device 1 for lighting the operating frequency indicator 121, the CPU temperature indicator 1221, the system temperature indicator 1222, the main board status indicator 1231, the memory status indicator 1232, the hard disk status indicator 1233, and the CD-ROM status indicator 1234 sequentially.

With reference to FIG. 2 in conjunction with FIG. 1, the operating frequency indicator 121 is able to show the operating frequency of CPU 21. Besides, there are several CPU speed bars defined. The number of speed bars of CPU 21 is defined as ten in this embodiment. In a normal status (i.e., no adjustment of CPU speed), the fifth speed bar is shown. If a user increases the operating frequency of CPU one stage by adjusting the adjusting unit 11 as stated above, the sixth speed bar is shown on the operating frequency indicator 121. On the contrary, a fourth speed bar is shown if the operating frequency of CPU 21 is decreased by one stage.

The CPU temperature indicator 1221 and the system temperature indicator 1222 are able to show CPU temperature and system temperature respectively. In a case that the display 12' is a LED display, each of the CPU temperature indicator 1221 and the system temperature indicator 1222 has three LEDs consisting of green, yellow, and red lamps. As designed, when green LEDs of the CPU temperature indicator 1221 and the system temperature indicator 1222 are lit, it means that both CPU temperature and system temperature are normal. In another case that yellow LEDs of the CPU temperature indicator 1221 and the system temperature indicator 1222 are lit, it means that both CPU temperature and system temperature are relatively high. In response, the rotating speed of fan mounted in the computer 2 will be increased by one stage for cooling as commanded by the microprocessor 13. In an extreme case that red LEDs of the CPU temperature indicator 1221 and the system temperature indicator 1222 are lit, it means that both CPU temperature and system temperature are too high. In response, the rotating speed of the fan will be increased to its maximum and the CPU over-temperature indicator 1241 and the system over-temperature indicator 1242 will be flashing continuously. After about 15 seconds, a shut down signal is transmitted to CPU 21 from the microprocessor 13 for automatically turning off the computer 2 if red LEDs of the CPU temperature indicator 1221 and the system temperature indicator 1222 are still lit.

A similar processing of both the CPU temperature indicator 1221 and the system temperature indicator 1222 is performed if the display 12' is an LCD. For example, if a monochrome LCD is used, three temperature stages are set with the first one representing a normal temperature the second one representing a slightly higher temperature, and the third one representing an excessively high temperature (i.e., over heat).

The motherboard status indicator 1231, the memory status indicator 1232, the hard disk status indicator 1233, and the CD-ROM status indicator 1234, are able to show the current status of the motherboard, memory, hard disk, and CD-ROM of computer 2, respectively. The motherboard status indicator 1231, the memory status indicator 1232, the hard disk status indicator 1233, and the CD-ROM status indicator 1234 are lit if the motherboard, memory, hard disk, and CD-ROM of the computer 2 operate normally. On the contrary, the indicator will be flashing if its corresponding component is malfunctioned. For example, the motherboard status indicator 1231 will be flashing if the motherboard is malfunctioned. At the same time, the call-help indicator 1243 is lit for visually warning that the system is malfunctioned. Additionally, a buzzer may be provided on the panel device 1. The buzzer will make a warning sound as activated by the microprocessor 13 if one of the components is malfunctioned.

Although the presented invention has been explained in relation to its preferred embodiment, it is to be understood that many other possible modifications and variations can be made without departing from the spirit and scope of the invention as hereinafter claimed.

What is claimed is:

1. A panel device mounted on the front side of a computer case for adjusting operating frequency and showing system information of a computer including a central processing unit (CPU), a basic input output system (BIOS), a system management (SM) bus and a system clock generator, the system clock generator providing a plurality of system clocks, wherein one of the system clocks is the operating frequency of the CPU, the panel device comprising:

an adjustment unit having a plurality of adjustment stages for enabling a user to selectively increase or decrease the operating frequency of the CPU;

a display module for showing the system information; and a microprocessor interconnecting the adjustment unit and the display module with the CPU, the microprocessor being capable of adjusting the operating frequency of the CPU in response to an adjustment done by the adjustment unit;

wherein the microprocessor issues an interrupt signal to the CPU for interrupting the CPU so as to control the system clock generator to modify the operating frequency of the CPU via the BIOS and SM bus, and the microprocessor also issues a service request to the computer to request the system information and then displays the system information on the display module, and wherein the displayed system information includes a CPU temperature, a system temperature, a motherboard status, a memory status, a hard disk status, and a CD-ROM status, and the display module comprises a plurality of display units for showing the CPU temperature, the system temperature, the motherboard status, the memory status, the hard disk status, and the CD-ROM status respectively.

2. The panel device as claimed in claim 1, wherein the display module comprises an operating frequency indicator for showing the operating frequency of the CPU.

3. The panel device as claimed in claim 1, wherein the display module is an LED.

4. The panel device as claimed in claim 1, wherein the display module is an LCD.

5. The panel device as claimed in claim 1, wherein the computer further comprises a plurality of operating elements and the display module comprises a call-help indicator that is lit when activated by the microprocessor if at least one of the operating elements has malfunctioned.

6. The panel device as claimed in claim 5, wherein the operating elements of the computer comprise a motherboard, a hard disk, a CD-ROM, and a memory.

7. The panel device as claimed in claim 5, further comprising a buzzer for making a warning sound when activated by the microprocessor if one of the operating elements has malfunctioned.

8. The panel device as claimed in claim 1, wherein the display units comprise a CPU temperature indicator and a system temperature indicator for showing the CPU temperature and the system temperature respectively, and wherein each of the CPU temperature indicator and the system temperature indicator comprises a green LED that is lit for representing a normal value of temperature, a yellow LED that is lit for representing a relatively high value of temperature, and a red LED that is lit for representing an over heat of temperature.

9. The panel device as claimed in claim 8, further comprising a fan being that is activated by the microprocessor for cooling the computer if the yellow LED is lit.

10. The panel device as claimed in claim 8, wherein in response to a lighting of the red LED for a predetermined period of time, the microprocessor issues a shut down signal to the CPU for automatically turning off the computer.

11. The panel device as claimed in claim 1, wherein the adjustment unit is a knob or a set of buttons including a speed-up button and a speed-down button mounted on the front side of a computer case, and accordingly one of the adjustment stages is manually determined to complete increasing or decreasing of the operating frequency of CPU.

* * * * *